US012681721B2

(12) United States Patent
Walker et al.

(10) Patent No.: US 12,681,721 B2
(45) Date of Patent: Jul. 14, 2026

(54) METHOD AND APPARATUS TO EXTEND IMMUTABLE DATA

(71) Applicant: Autodesk, Inc., San Francisco, CA (US)

(72) Inventors: Raymond E. Walker, White Lake, MI (US); William K. Sterbenz, Rochester Hills, MI (US)

(73) Assignee: AUTODESK, INC., San Francisco, CA (US)

( * ) Notice: Subject to any disclaimer, the term of this patent is extended or adjusted under 35 U.S.C. 154(b) by 154 days.

(21) Appl. No.: 18/505,796

(22) Filed: Nov. 9, 2023

(65) Prior Publication Data

US 2025/0156179 A1 May 15, 2025

(51) Int. Cl.
*G06F 8/71* (2018.01)

(52) U.S. Cl.
CPC ..................................... *G06F 8/71* (2013.01)

(58) Field of Classification Search
CPC ...................................................... G06F 8/71
See application file for complete search history.

(56) References Cited

U.S. PATENT DOCUMENTS

| | | | | |
|---|---|---|---|---|
| 7,613,743 | B1 * | 11/2009 | Giampaolo | ......... G06F 11/1441 707/999.203 |
| 8,266,122 | B1 | 9/2012 | Newcombe et al. | |
| 9,098,500 | B1 | 8/2015 | Asokan et al. | |
| 9,465,863 | B2 | 10/2016 | Lee et al. | |

| | | | | |
|---|---|---|---|---|
| 10,019,467 | B2 * | 7/2018 | Raviola | ............. G06Q 10/0631 |
| 10,733,159 | B2 * | 8/2020 | Sawhney | .............. G06F 16/219 |
| 10,817,204 | B1 * | 10/2020 | Danilov | ................ G06F 3/0604 |
| 11,436,201 | B2 | 9/2022 | Shaw et al. | |
| 11,586,603 | B1 | 2/2023 | Rozenfeld et al. | |
| 12,008,006 | B1 * | 6/2024 | Beveridge | ........... G06F 16/2477 |
| 12,197,296 | B1 * | 1/2025 | Gussin | ................ G06F 11/1451 |
| 2011/0191285 | A1 * | 8/2011 | Sawai | ................ G01C 21/3878 707/E17.022 |
| 2011/0282708 | A1 | 11/2011 | Rangaswamy et al. | |
| 2015/0066851 | A1 | 3/2015 | Henderson | |
| 2017/0039042 | A1 * | 2/2017 | Crossley | ................... G06F 8/36 |
| 2018/0075076 | A1 * | 3/2018 | Sawhney | .............. G06F 16/219 |
| 2018/0365201 | A1 | 12/2018 | Hunn et al. | |
| 2020/0349468 | A1 | 11/2020 | Arya et al. | |
| 2020/0351323 | A1 * | 11/2020 | Gong | .................... G06F 16/176 |
| 2021/0097061 | A1 * | 4/2021 | Amihod | ................. G06F 16/20 |

(Continued)

FOREIGN PATENT DOCUMENTS

WO            2002028007            4/2002

OTHER PUBLICATIONS

Extended European Search Report dated Aug. 22, 2024 for European Patent Application No. 24166456.4.

(Continued)

*Primary Examiner* — Douglas M Slachta
(74) *Attorney, Agent, or Firm* — Gates & Cooper LLP

(57) ABSTRACT

A method and system provide the ability to extend immutable data. A first version of immutable design data is created. The first version of immutable design data is edited to create a second version of immutable design data. Subsequent to the creation of the second version of immutable data, the first version of immutable design data is augmented with first extendable data without creating a new version of immutable data.

20 Claims, 5 Drawing Sheets

(56)                    References Cited

U.S. PATENT DOCUMENTS

| | | | |
|---|---|---|---|
| 2022/0358257 A1* | 11/2022 | Chang | G06F 30/12 |
| 2023/0177039 A1* | 6/2023 | Muralidhar | G06F 16/2322 |
| | | | 707/703 |
| 2024/0403542 A1* | 12/2024 | Jindal | G06F 40/197 |
| 2025/0036691 A1* | 1/2025 | Zuzart | G06F 16/906 |

OTHER PUBLICATIONS

"Inventor 2023 Help : About iParts : Autodesk", Inventor 2023 Help, Apr. 2022, pp. 1-6, https://web.archive.org/web/20220429225342/ https://help.autodesk.com/view/INVNTOR/2023/ENU/?guid=GUID-9D7FF4CB-6045-4E2A-AC88-40A2F4DDF392, XP093192449.
"When to Use Forking vs. Cloning in Version Control", Cadence, https://resources.pcb.cadence.com/blog/when-to-use-forking-vs-cloning-in-version-control, as downloaded Jun. 5, 2023, pp. 1-5.
Ruparelia, N.B., "The history of version control", ACM SIGSOFT Software Engineering Notes, 2010, p. 5.
"Configure immutability policies for blob versions", Microsoft, Nov. 2023, https://learn.microsoft.com/en-us/azure/storage/blobs/ immutable-policy-configure-version-scope?tabs=azure-portal, as downloaded Feb. 9, 2024, pp. 1-21.
European Examination Report dated Mar. 9, 2026 for European Patent Application No. 24166456.4.

* cited by examiner

METHOD AND APPARATUS TO EXTEND IMMUTABLE DATA

BACKGROUND OF THE INVENTION

1. Field of the Invention

The present invention relates generally to plant design management systems (PDMS), and in particular, to a method, apparatus, system, and article of manufacture for utilizing state based properties and extending immutable data in such systems.

2. Description of the Related Art

In files, computer aided design (CAD) models, PDMS systems, etc., it may be desirable to add data to already created systems after a version has been created (e.g., mass data or simulation data as described in further details below). In PDMS systems, as properties change, the form, fit, and function of the underlying data is also changed. As used herein, form, fit and function (F3 or FFF) is a concept used in manufacturing, engineering and architecture to describe aspects of a product's design, performance, and compliance to a specification. F3 refers to a set of characteristics or requirements that are essential for the design and compatibility of products, components, or systems, and can have legal considerations in regulated industries like aviation and defense. To save the changes, newer versions of the underlying data are created and saved. In this regard, the data is versioned and new changes to those properties create new versions (on the latest data). Such properties are referred to as state-based properties. As new versions are created with changes in data, the prior art systems do not allow the underlying data to remain immutable (i.e., unchanging over time). Instead, a new version of the underlying data is created and overwrites the prior version. Some prior art systems address this problem using branching or attaching data. However, these prior art approaches introduce other problems. To better understand the problems of the prior art, a description of prior art data extension, branching, data attachment, and state based properties may be useful.

In file systems, CAD models, PDMS systems, etc., there is a desire to add data to underlying data after a version has been created. For example, suppose a CAD model has six different versions (e.g., V1, V2, V3, V4, V5, and V6) of boxes. It may be desirable to add the volume and bounding information of a certain box that is unique to only a particular version. In another example, an early version of a box (e.g., V2) may not have a mass associated with it. Further, a later version of that same box (e.g., V4) may have a hole drilled in the box and the mass associated with V4 is a weight of 8 lbs. The user may be interested in V2 but the mass of 8 lbs from V4 does not apply to V2 because of the hole. Further, the user may want to add the mass of 10 lbs to V2 and similarly, the added mass will not apply to V4. It is desirable to add such data/attribute values to V2 without saving a new version.

Another example of the deficiencies of the prior art relates to watermarking. Suppose there is a single timeline of drawings with fixed pixels (e.g., such that the drawing can be printed out). If the user wants to make a design change, the tip drawing needs to be altered/modified to create a new version. However, it may be desirable to take an existing earlier version and print the earlier version out with a watermark showing whether that drawing has been released or not. The prior art fails to provide the ability to alter the pixels of the earlier drawing version to add the watermark without changing anything else on the earlier drawing version. Instead, prior art systems can only release the tip drawing. Thus, to print the earlier version with the watermark, the user would need to promote the earlier version to the most recent version (i.e., the tip drawing) modify it to add the watermark, and then print it. Such a sequence is undesirable as the user merely wanted to mark the earlier version as being released and the later version is still useful.

In yet another example, a user may want to perform an environmental impact study of an older version that has already been built/shipped. Prior art systems fail to provide the ability to add environmental impact study data to earlier versions without affecting the later versions.

One prior art approach for handling versioning and updated data is that of branching. Branching is a system that doesn't maintain a consistent history. Each branch has its own history and if brought back to the main branch, will version the data at the tip. While branching may attempt to retain prior versions in an immutable form, such attempts require adherence to strict limitations and constraints. For example, limitations and constraints may require that the changed data is never merged back, and/or that only external data that does not change form, fit, or function may be modified in the branch. In this regard, branched data is seen as something diverging from the original data. Further, branching requires merging where merging branches typically require a new latest version to be created. For example, with a branch, if the user is in version 10 and goes back and changes version 1, the prior branching system would create version 1.1, 1.2, etc. which is then stored independently. Later, the prior art may attempt to merge such independently stored version with the later versions resulting in artifacts or undesirable consequences (e.g., lost data from later versions, overlapping/conflicting data from different versions, etc.). Further, the user may not desire to create version 1.1, 1.2, etc., and may have simply wanted to augment/add data to data/objects in version 1. Further, the branching approach fails to provide the ability to add additional versions to the augmented data without affecting the underlying base data (e.g., suppose simulation data has been added to an earlier version and the simulation has changed such that newer/updated simulation data needs to be added).

Some PDMS systems attach additional data to underlying data where the attached data is stored together with underlying immutable data (i.e., overwriting portions of the underlying data so that it is not actually immutable). In this regard, the prior art approach of attaching data fails to: (i) allow independent versioning of the added data (i.e., independent of the underlying data to which the attachment applies); (ii) attach to historical data at any time; and (iii) independently/separately manage permissions for each extension data (i.e., a separate permission model).

In view of the above, it may be noted that state based properties provide an unnatural way to address the problems of retaining immutable data while extending properties to such immutable data. In this regard, state-based properties have a purpose of modifying the form, fit, and function of the data, a purpose completely different from that of the present invention. Accordingly, state-based properties simply don't apply to the present problem and/or solution.

In view of the above, what is needed is a system that overcomes the problems/deficiencies of the prior art. Such problems/deficiencies include:

(i) The prior art's requirement that an external party have write-permissions to the immutable data;

(ii) The prior art's inability to historically add/modify data without having to create new versions of the original data;

(iii) The prior art's inability to independently version external data without branching to provide a clean and understandable history of the external data; and (iv) The prior art's inability to provide an independent permissions model of the external data not directly tied to that of the immutable data.

SUMMARY OF THE INVENTION

Embodiments of the invention provide the ability to augment underlying immutable data while overcoming the prior art problems and deficiencies. In particular:

(i) There is no need for the external party to have write-permissions to the immutable data. Technically, not even read-permission is needed, but to create relationships, embodiments may need to start with an object which most likely had to be read.

(ii) Being that versions are immutable, embodiments of the invention allow data to be historically added/modified without having to create new versions of the original data.

(iii) Embodiments of the invention allow for independent versioning of the external data without branching, providing clean and understandable history of the external data; and (iv) An independent permissions model of the external data not directly tied to that of the immutable data is provided/enabled.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Embodiments of the invention solve the problems of the prior art by making use of a system that separates data based on how it impacts FFF (requiring new versions) or is augmenting historical data. Specifically, a relationship between the immutable data and the extended data is used. The relationship is designed to work with immutable data. That is, the relationship itself does not cause a revision change in the immutable data. When considering the original immutable data, all the related objects are combined to form a single view including the data added by the external party. Given that the data is associated with a revision of the immutable data, there is the opportunity to have a separate revision history of the extended data without impacting the history of the immutable data. This applies to any historical version of the immutable data. Further, embodiments of the invention can go back in time, add the extended data to a version in history and not have new versions of the immutable data. That extended data can then be revisioned without impacting the history of the immutable data.

Figure 1:
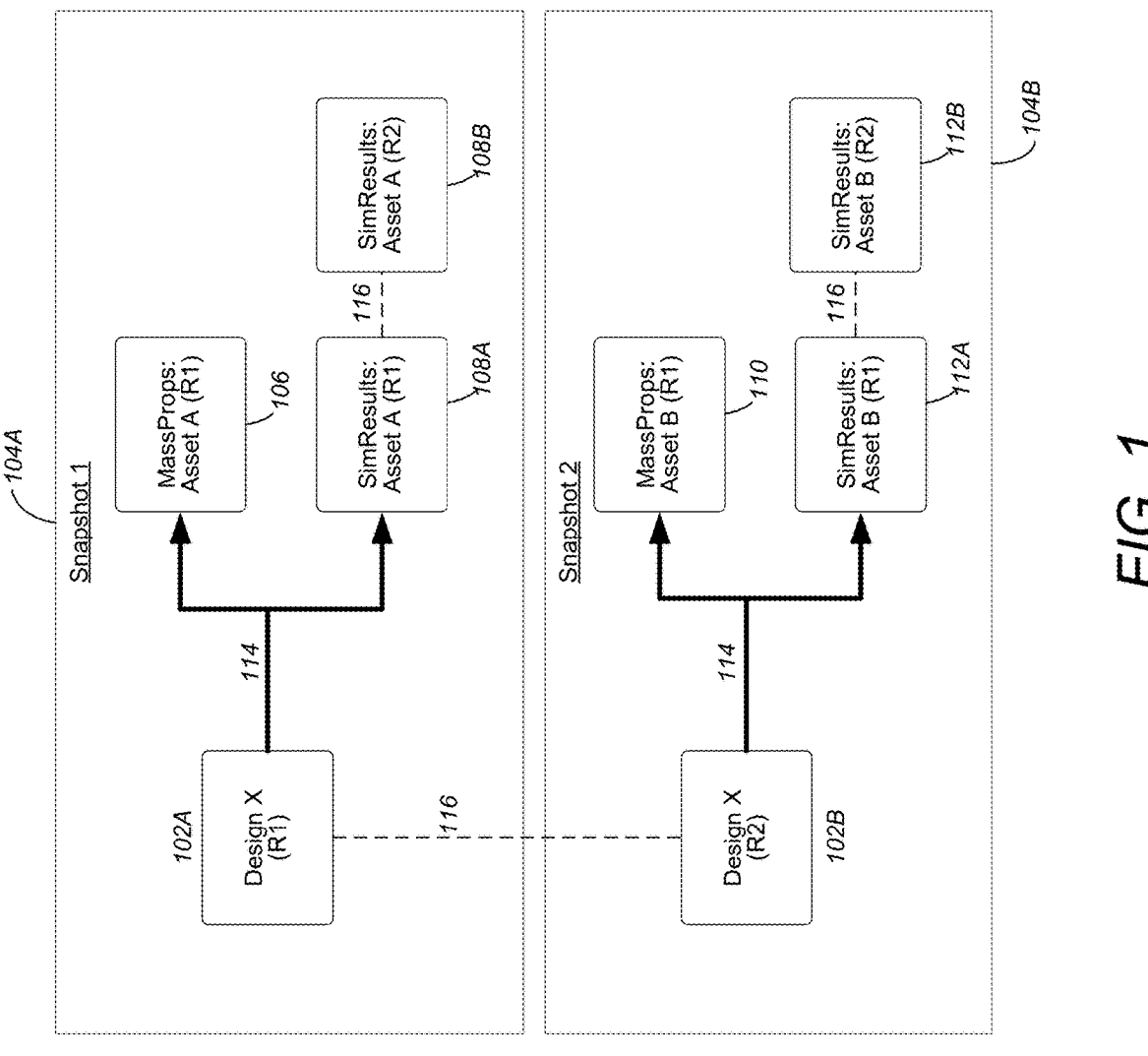
FIG. 1 illustrates an example of extended data in accordance with one or more embodiments of the invention.
Figure 2:
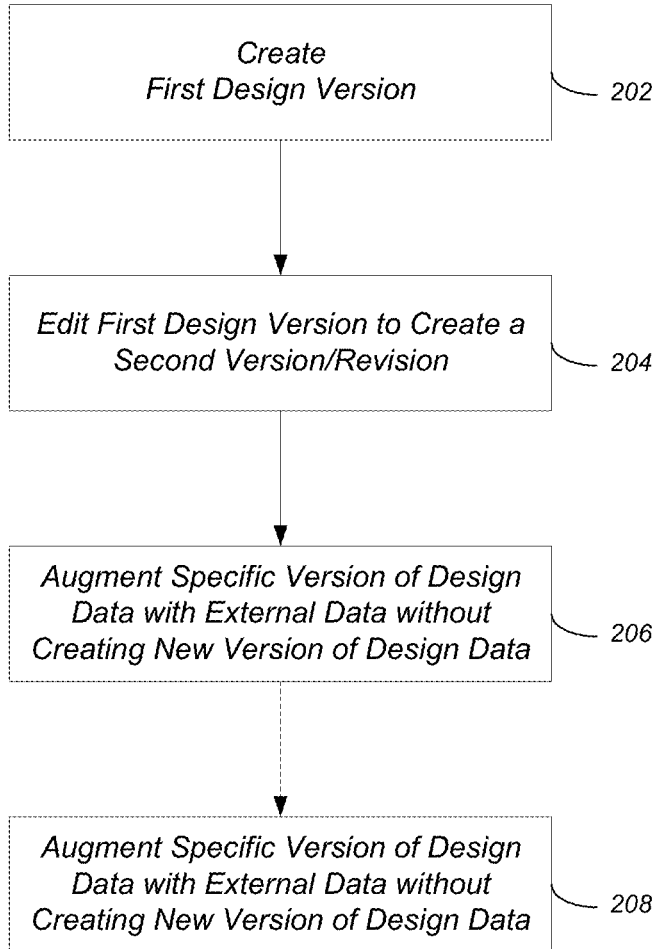
FIG. 2 illustrates the logical flow for creating the extended data in accordance with one or more embodiments of the invention.

FIG. 1 illustrates an example of extended data in accordance with one or more embodiments of the invention. FIG. 2 illustrates the logical flow for creating the extended data in accordance with one or more embodiments of the invention. At step 202, a first version 102A of a design/design data is created. All versions of the design data are collectively referred to as design data 102 while specific versions of the data 102 are labeled with letters—i.e., design data 102A and design data 102B. Further, as used herein, the design data 102 may also be referred to as underlying data 102 and/or immutable data 102.

The first step 202 creates a first version of the design data 102A (depicted as Design X (R1). Such design data 102A is immutable design data. The first version of the design data 102A is represented in a grouping of data referred to as a snapshot 104A.

At step 204, the first version of the design data 102A is edited to create the second version of the design data 102B (labeled in FIG. 1 as Design X (R2)). The grouping of data associated with the second version of the deign data 102B is referred to as snapshot 104B (snapshots 104A and 104B may collectively be referred to as snapshots 104). In one or more embodiments, the edit of the first version of the design data 102A may consist of changing a state based property, thereby forcing a new version of the data 102 as the latest version (i.e., the latest version in FIG. 1 is the second version of the design data 102B). Thus, the specific immutable data 102 changes from Version 1 102A to Version 2 102B.

At step 206, a specific version of the design data 102A/102B is augmented with external data 106, 108, 110, and 112, without creating a new version of the design data 102. In other words, attached to a specific version of the design data 102A/102B is the extended/external data 106, 108, 110, and 112, which itself may have its own history, independent of the underlying immutable design data 102A/102B. Further, the specific versions of extended/external data 106, 108, 110, and 112 (that are associated with specific versions of the design data 102A/102B) do not impact other versions of the immutable data 102A/102B. The external data 106, 108, 110, and 112 can be attached at any time subsequent to the immutable data 102 being versioned—there is no need to attach the external data 106, 108, 110, and 112 to the version of the immutable data 102 that is the most recent version (i.e., design data 102B). Further, adding the relationships (e.g., to/from the external data 106, 108, 110, and 121) does not create/generate a revision to the design data 102 or the snapshot 104.

Thus, in view of the above, subsequent to the creation of the second version of immutable data 102B, the first version of immutable data 102A is augmented with first extendable data 106/108 without creating a new version of immutable data. Further, the first extendable data 108A may be versioned to created second extendable data 108B (without creating a new version of immutable data). In additional embodiments, the second version of immutable data 102B may be augmented with second extendable data 110/112 without creating a new version of immutable data.

As an example of step 206 (as illustrated in FIG. 1), Mass Props Asset A (revision 1) 106 and Simulation Results Asset B (revision 1) 108 have both been attached to the first version of the design data 102A. In other words, the external data consists of assets 106 and 108 that are associated with/attached to design data 102A. Such assets 106 and 108 can be added on demand without impacting the history of the underlying design data 102A. Similarly, the example illustrated in FIG. 1 includes external data assets 110 and 112 that are associated with design data 102B.

Optional step 208 provides for creating an additional revision 108B/112B of an external data asset 108A/112A respectively, without creating new versions/revisions of the design data 102A/102B.

In view of the above, steps 202-204 create the first version of the design data 102A and the second version of the design data 102B. Thereafter, Step 206 augments the design data 102A with external data assets 106 and 108. Step 206 may further include augmenting design data 102B with external data assets 110 and 112. Optional step 208 provides for generating second revisions of the external data 108B and 112B (based on 108A and 112A respectively) also without generating a new version of the design data 102A/102B.

The snapshots 104 record the history/grouping of everything in the group the snapshot 104 encompasses. Each snapshot 104 can be overlaid on top of a graph database itself or could be stored within the mechanism/database used to store the design data (e.g., a relational and/or graph/graph database). In FIG. 1, relationships within the storage mechanism between objects/assets are indicated by solid lines 114 while dotted lines 116 are not indicative/reflective of a relationship between objects/assets. Thus, in one or more embodiments of the invention, snapshots 104A/104B provide/consist of/identify a group/grouping mechanism. To identify items/assets/objects within a group, snapshots 104 may store a list of the identifiers for each item contained within that snapshot's group.

In an example of snapshots illustrated in FIG. 1, the first version of immutable design data 102A and the first extendable data 106/108 may be stored in a first snapshot where the list of identifiers for each item grouped in the first snapshot is stored in a group in a database. Similarly, the second version of immutable design data 102B may be grouped into a second snapshot along with other items associated wit the second version of immutable design data 102B (e.g., extendable data 110-112). A list of identifiers for may be stored for each item grouped in the second snapshot in a second snapshot group in the database.

In view of the above, one or more embodiments of the invention may utilize/store a graph (multiple objects/design data assets 102 with relationships) (e.g., within a database) and as such, utilizing a single design object 102A or 102B may not accurately reflect embodiments of the invention. With a graph/hierarchical structure, the augmented data 106-112 may be stored as nodes (e.g., a first node for the first version of immutable design data 102A, a second node for the second version of immutable design data 102B, and a third node for the first extendable data 106/108) of/in the graph. Further, one or more embodiments of the invention may utilize a graph database, relational database, or any other type of database/storage mechanism that enables the storage of objects/nodes and relationships between such objects/nodes. Further, embodiments of the invention may also provide a versioning mechanism within the storage mechanism/structure/database that provides/enables a way to express versions of the design data 102. To retrieve the first version of immutable data 102A as well as the first extendable data 106/108, the list of identifiers may be read from the database. Such a retrieval of data does not affect a data history of the first extendable data 106/108 or the immutable data history of the first version of immutable data 102A.

In view of the above, the following provides an exemplary versioning for extending data in accordance with one or more embodiments of the invention:

(1) Immutable Data(Version 1) 4 extended data (v1, v2, . . . ) (could be added before or after data introduced to version 2)

(2) Immutable Data(Version 2) 4 extended data (v1, v2, . . . )

With such an exemplary versioning, the first extendable data 106/108 may be added to a history of the first version of immutable data 102A without having to create new version of the immutable data. Further, the first version of immutable design data 102A and the first extendable data 106/108 may be stored separately. In addition, permissions for the first extendable data 106 may be managed independently from second extendable data 108 (i.e., that is associated with the same version of immutable data 102A).

Exemplary Implementation

Figure 3:
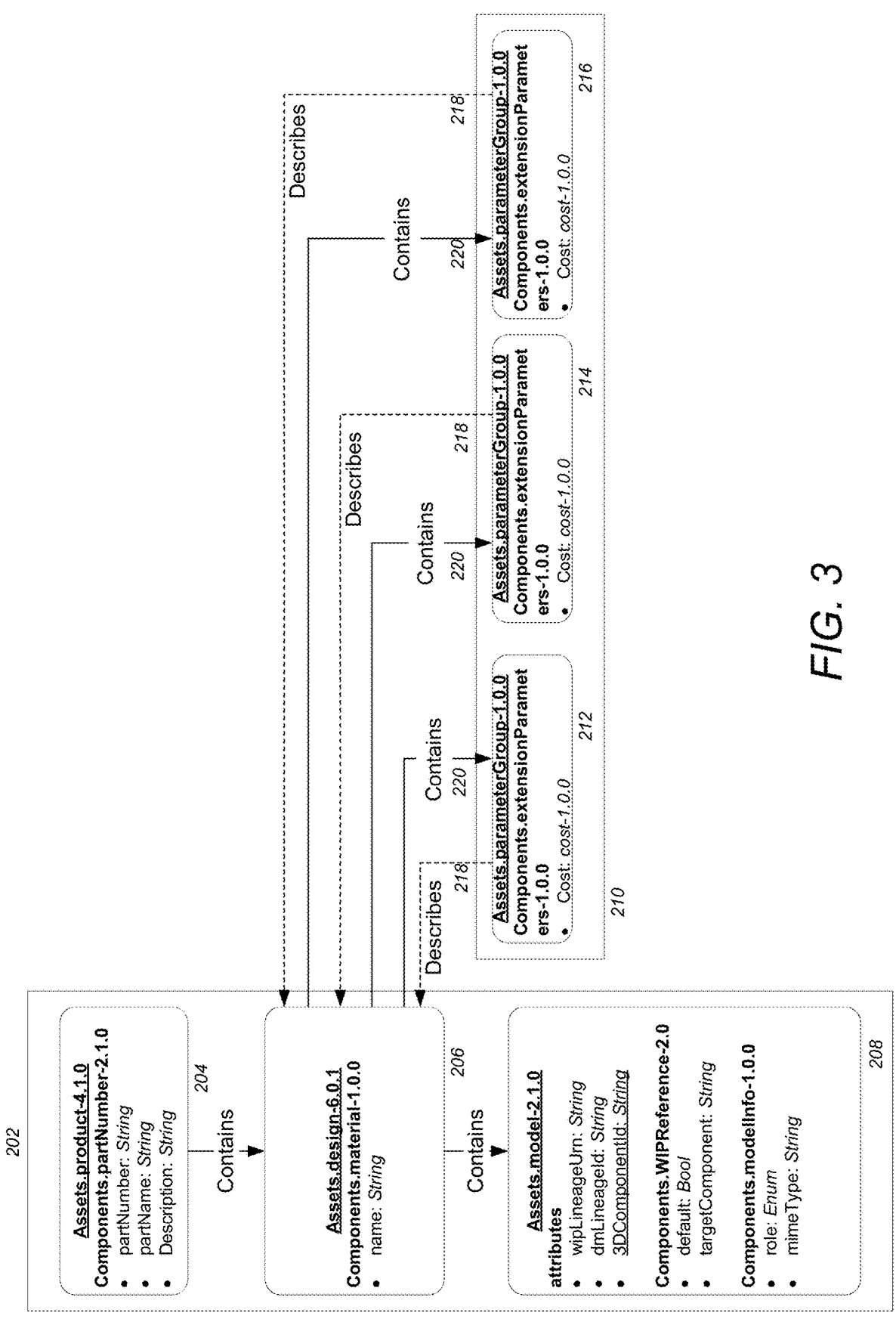
FIG. 3 illustrates an exemplary data-model for descriptive properties that may be used for extending data in accordance with one or more embodiments of the invention.

FIG. 3 illustrates an exemplary data-model for descriptive properties that may be used for extending data in accordance with one or more embodiments of the invention.

As illustrated, the storage system 302 consists of various objects/assets 204, 206, and 208. In this regard, the product part number asset/object 204 contains a design object 206 which in turn contains the model object 208 (which provides attributes, and component information). Version 6.0.1 of the design object/asset 206 has extendable/external data 210. The extendable/external data 210 consists of various parameters 212, 214, and 216 that are contained by design asset 206 and that describe design asset 206 (as indicated by the relationship arrows 218 and 220).

Hardware Environment

Figure 4:
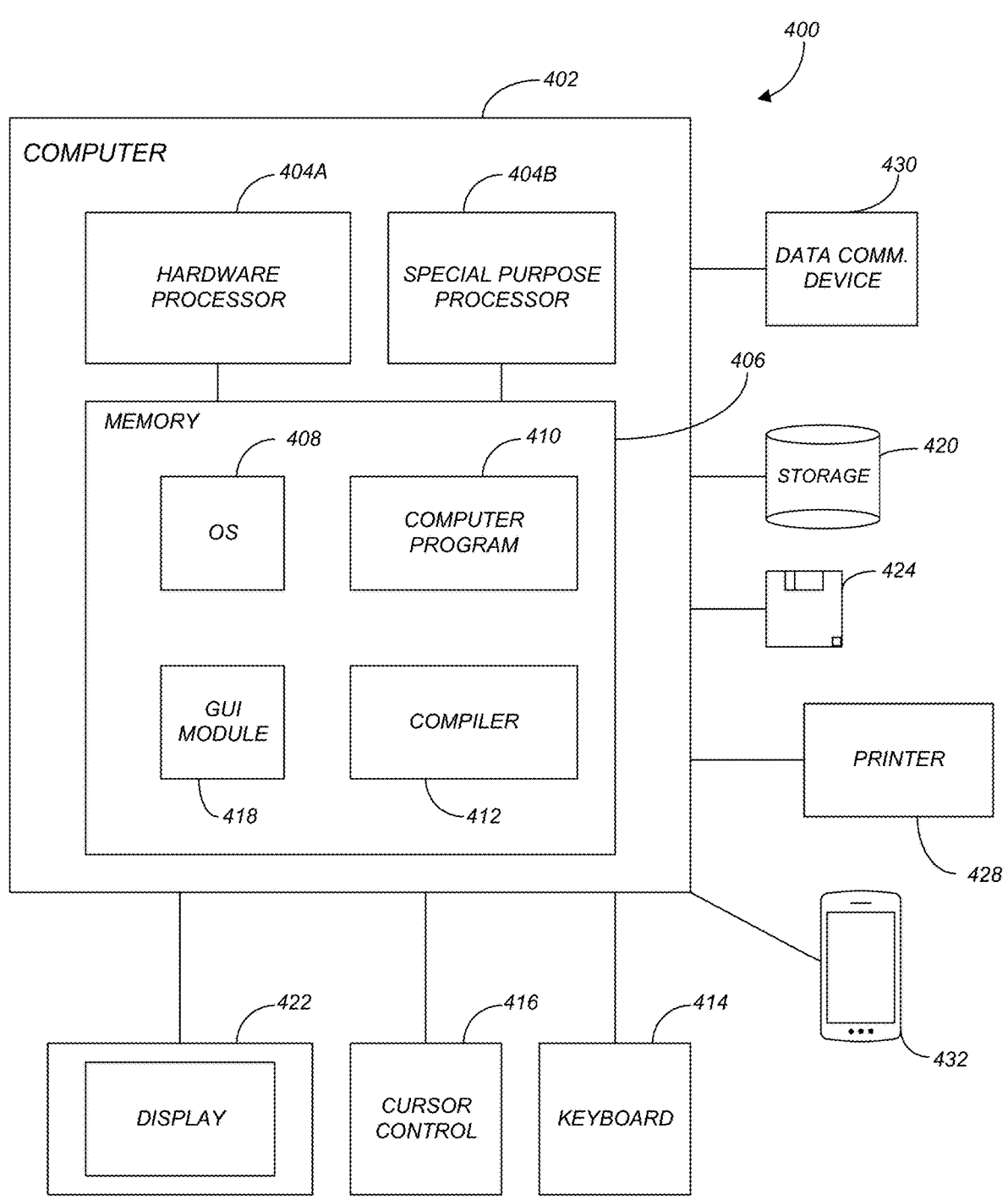
FIG. 4 is an exemplary hardware and software environment used to implement one or more embodiments of the invention.

FIG. 4 is an exemplary hardware and software environment 400 (referred to as a computer-implemented system and/or computer-implemented method) used to implement one or more embodiments of the invention. The hardware and software environment includes a computer 402 and may include peripherals. Computer 402 may be a user/client computer, server computer, or may be a database computer. The computer 402 comprises a hardware processor 404A and/or a special purpose hardware processor 404B (hereinafter alternatively collectively referred to as processor 404) and a memory 406, such as random access memory (RAM). The computer 402 may be coupled to, and/or integrated with, other devices, including input/output (I/O) devices such as a keyboard 414, a cursor control device 416 (e.g., a mouse, a pointing device, pen and tablet, touch screen, multi-touch device, etc.) and a printer 428. In one or more embodiments, computer 402 may be coupled to, or may comprise, a portable or media viewing/listening device 432 (e.g., an MP3 player, IPOD, NOOK, portable digital video player, cellular device, personal digital assistant, etc.). In yet another embodiment, the computer 402 may comprise a multi-touch device, mobile phone, gaming system, internet enabled television, television set top box, or other internet enabled device executing on various platforms and operating systems.

In one embodiment, the computer 402 operates by the hardware processor 404A performing instructions defined by the computer program 410 (e.g., a computer-aided design

[CAD] application) under control of an operating system 408. The computer program 410 and/or the operating system 408 may be stored in the memory 406 and may interface with the user and/or other devices to accept input and commands and, based on such input and commands and the instructions defined by the computer program 410 and operating system 408, to provide output and results.

Output/results may be presented on the display 422 or provided to another device for presentation or further processing or action. In one embodiment, the display 422 comprises a liquid crystal display (LCD) having a plurality of separately addressable liquid crystals. Alternatively, the display 422 may comprise a light emitting diode (LED) display having clusters of red, green and blue diodes driven together to form full-color pixels. Each liquid crystal or pixel of the display 422 changes to an opaque or translucent state to form a part of the image on the display in response to the data or information generated by the processor 404 from the application of the instructions of the computer program 410 and/or operating system 408 to the input and commands. The image may be provided through a graphical user interface (GUI) module 418. Although the GUI module 418 is depicted as a separate module, the instructions performing the GUI functions can be resident or distributed in the operating system 408, the computer program 410, or implemented with special purpose memory and processors.

In one or more embodiments, the display 422 is integrated with/into the computer 402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 402 according to the computer program 410 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program 410 instructions. In one embodiment, the special purpose processor 404B is an application specific integrated circuit (ASIC).

The computer 402 may also implement a compiler 412 that allows an application or computer program 410 written in a programming language such as C, C++, Assembly, SQL, PYTHON, PROLOG, MATLAB, RUBY, RAILS, HASKELL, or other language to be translated into processor 404 readable code. Alternatively, the compiler 412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 410 accesses and manipulates data accepted from I/O devices and stored in the memory 406 of the computer 402 using the relationships and logic that were generated using the compiler 412.

The computer 402 also optionally comprises an external communication device such as a modem, satellite link, Ethernet card, or other device for accepting input from, and providing output to, other computers 402.

In one embodiment, instructions implementing the operating system 408, the computer program 410, and the compiler 412 are tangibly embodied in a non-transitory computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of computer program 410 instructions which, when accessed, read and executed by the computer 402, cause the computer 402 to perform the steps necessary to implement and/or use the present invention or to load the program of instructions into a memory 406, thus creating a special purpose data structure causing the computer 402 to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 402.

Figure 5:
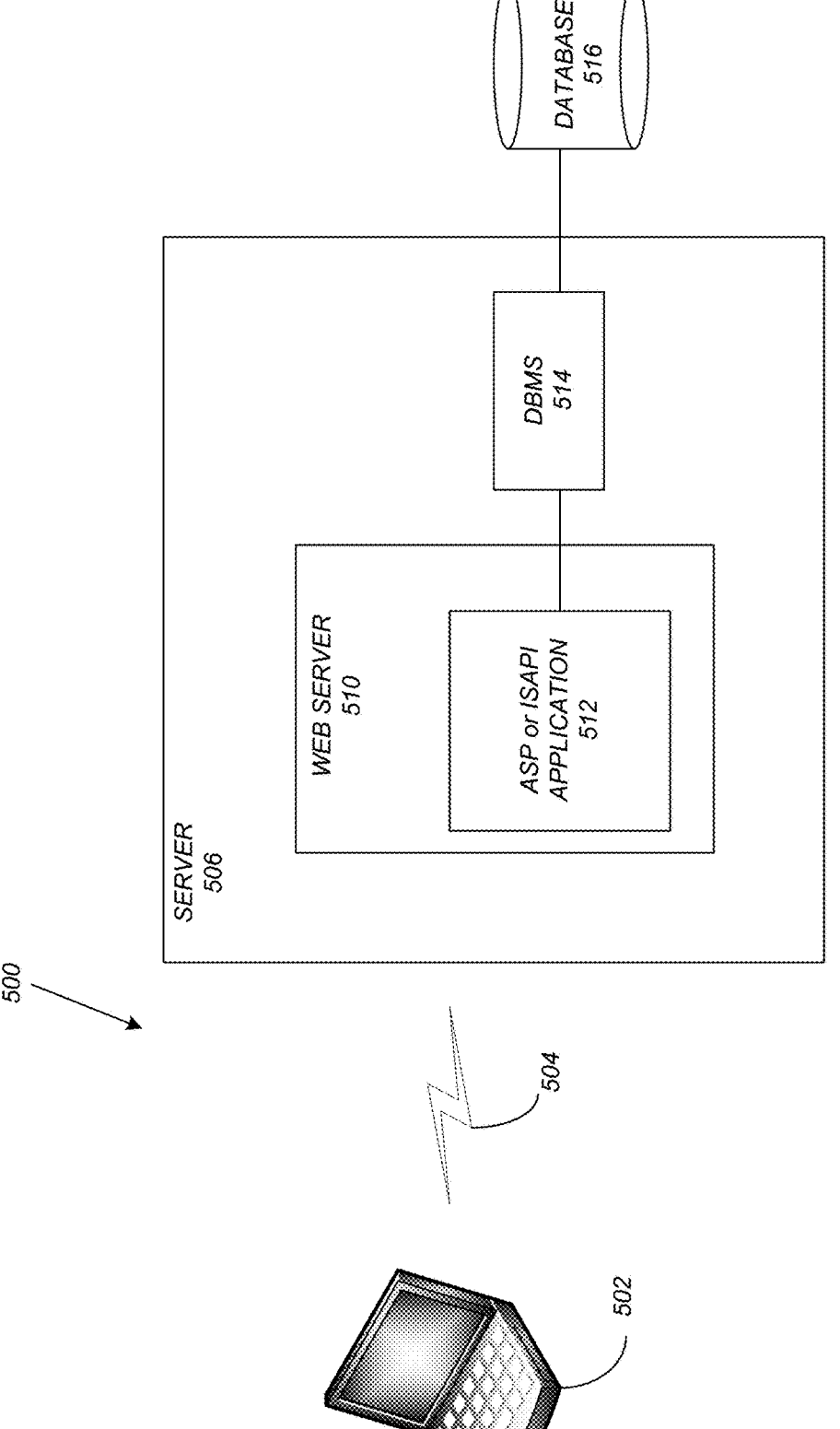
FIG. 5 schematically illustrates a typical distributed/cloud-based computer system in accordance with one or more embodiments of the invention.

FIG. 5 schematically illustrates a typical distributed/cloud-based computer system 500 using a network 504 to connect client computers 502 to server computers 506. A typical combination of resources may include a network 504 comprising the Internet, LANs (local area networks), WANs (wide area networks), SNA (systems network architecture) networks, or the like, clients 502 that are personal computers or workstations (as set forth in FIG. 4), and servers 506 that are personal computers, workstations, minicomputers, or mainframes (as set forth in FIG. 4). However, it may be noted that different networks such as a cellular network (e.g., GSM [global system for mobile communications] or otherwise), a satellite based network, or any other type of network may be used to connect clients 502 and servers 506 in accordance with embodiments of the invention.

A network 504 such as the Internet connects clients 502 to server computers 506. Network 504 may utilize ethernet, coaxial cable, wireless communications, radio frequency (RF), etc. to connect and provide the communication between clients 502 and servers 506. Further, in a cloud-based computing system, resources (e.g., storage, processors, applications, memory, infrastructure, etc.) in clients 502 and server computers 506 may be shared by clients 502, server computers 506, and users across one or more networks. Resources may be shared by multiple users and can be dynamically reallocated per demand. In this regard, cloud computing may be referred to as a model for enabling access to a shared pool of configurable computing resources.

Clients 502 may execute a client application or web browser and communicate with server computers 506 executing web servers 510. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 502 may be downloaded from server computer 506 to client computers 502 and installed as a plug-in or ACTIVEX control of a web browser. Accordingly, clients 502 may utilize ACTIVEX components/component object model (COM) or distributed COM (DCOM) components to provide a user interface on a display of client 502. The web server 510 is typically a program such as MICROSOFT'S INTERNET INFORMATION SERVER.

Web server 510 may host an Active Server Page (ASP) or Internet Server Application Programming Interface (ISAPI) application 512, which may be executing scripts. The scripts invoke objects that execute business logic (referred to as business objects). The business objects then manipulate data in database 516 through a database management system (DBMS) 514. Alternatively, database 516 may be part of, or connected directly to, client 502 instead of communicating/ obtaining the information from database 516 across network 504. When a developer encapsulates the business function-ality into objects, the system may be referred to as a component object model (COM) system. Accordingly, the scripts executing on web server 510 (and/or application 512) invoke COM objects that implement the business logic. Further, server 506 may utilize MICROSOFT'S TRANS-ACTION SERVER (MTS) to access required data stored in database 516 via an interface such as ADO (Active Data Objects), OLE DB (Object Linking and Embedding Data-Base), or ODBC (Open DataBase Connectivity).

Generally, these components 500-516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present inven-tion being performed.

Although the terms "user computer", "client computer", and/or "server computer" are referred to herein, it is under-stood that such computers 502 and 506 may be interchange-able and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 502 and 506. Embodiments of the invention are implemented as a software/CAD application on a client 502 or server computer 506. Further, as described above, the client 502 or server computer 506 may comprise a thin client device or a portable device that has a multi-touch-based display.

CONCLUSION

This concludes the description of the preferred embodi-ment of the invention. The following describes some alter-native embodiments for accomplishing the present inven-tion. For example, any type of computer, such as a mainframe, minicomputer, or personal computer, or com-puter configuration, such as a timesharing mainframe, local area network, or standalone personal computer, could be used with the present invention.

The foregoing description of the preferred embodiment of the invention has been presented for the purposes of illus-tration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for extending immu-table data, comprising:
creating a first version of immutable design data;
editing the first version of immutable design data to create a second version of immutable design data; and
augmenting the second version of the immutable design data with third extendable data, wherein the second version of the immutable design data and the third extendable data are represented in a grouping of data referred to as a second snapshot;
subsequent to the creation of the second version of immutable design data and subsequent to a creation of the third extendable data, augmenting the first version of immutable design data with first extendable data without creating a new version of immutable data and without revising the second snapshot, wherein the first version of immutable design data and the first extend-able data are represented in a grouping of data referred to as a first snapshot.

2. The computer-implemented method of claim 1, further comprising:
augmenting the second version of immutable data with second extendable data without creating a new version of immutable data.

3. The computer-implemented method of claim 1, further comprising:
creating second extendable data without creating a new version of immutable data, wherein the second extend-able data comprises a second version of the first extend-able data.

4. The computer-implemented method of claim 1, further comprising:
storing the first version of immutable design data as a first node in a graph within a database;
storing the second version of immutable design data as a second node in the graph in the database;
storing the first extendable data as a third node in the graph in the database.

5. The computer-implemented method of claim 1, further comprising:
storing a list of identifiers for each item grouped in the first snapshot in a first snapshot group in a database.

6. The computer-implemented method of claim 5, further comprising:
storing a list of identifiers for each item grouped in the second snapshot in a second snapshot group in the database.

7. The computer-implemented method of claim 5, further comprising:
retrieving the first version of immutable data by reading the list of identifiers from the database;
retrieving the first extendable data by reading the list of identifiers from the database;

wherein the retrieving of the first version of immutable data does not affect a first extendable data history of the first extendable data; and wherein the retrieving of the first extendable data does not affect an immutable data history of the first version of the immutable data.

8. The computer-implemented method of claim 1, wherein:

the first extendable data is added to a history of the first version of immutable data without having to create new versions of the immutable data.

9. The computer-implemented method of claim 1, wherein:

the first version of the immutable design data and the first extendable data are stored separately.

10. The computer-implemented method of claim 1, further comprising:

managing permissions for the first extendable data; and independently managing permissions for second extendable data, wherein the second extendable data is augmented from the first version of the immutable design data without creating a new version of immutable data.

11. A computer-implemented system for extending immutable data, comprising:

(a) a computer having a memory;

(b) a processor executing on the computer; and (c) the memory storing a set of instructions, wherein the set of instructions, when executed by the processor cause the processor to perform operations comprising:

(i) creating a first version of immutable design data;

(ii) editing the first version of immutable design data to create a second version of immutable design data;

(111) augmenting the second version of the immutable design data with third extendable data, wherein the second version of the immutable design data and the third extendable data are represented in a grouping of data referred to as a second snapshot; and (iv) subsequent to the creation of the second version of immutable design data and subsequent to a creation of the third extendable data, augmenting the first version of immutable design data with first extendable data without creating a new version of immutable data and without revising the second snapshot, wherein the first version of immutable design data and the first extendable data are represented in a grouping of data referred to as a first snapshot.

12. The computer-implemented system of claim 11, the operations further comprising:

augmenting the second version of immutable data with second extendable data without creating a new version of immutable data.

13. The computer-implemented system of claim 11, the operations further comprising:

creating second extendable data without creating a new version of immutable data, wherein the second extendable data comprises a second version of the first extendable data.

14. The computer-implemented system of claim 11, the operations further comprising:

storing the first version of immutable design data as a first node in a graph within a database;

storing the second version of immutable design data as a second node in the graph in the database;

storing the first extendable data as a third node in the graph in the database.

15. The computer-implemented system of claim 11, the operations further comprising:

storing a list of identifiers for each item grouped in the first snapshot in a first snapshot group in a database.

16. The computer-implemented system of claim 15, the operations further comprising:

storing a list of identifiers for each item grouped in the second snapshot in a second snapshot group in the database.

17. The computer-implemented system of claim 15, the operations further comprising:

retrieving the first version of immutable data by reading the list of identifiers from the database;

retrieving the first extendable data by reading the list of identifiers from the database;

wherein the retrieving of the first version of immutable data does not affect a first extendable data history of the first extendable data; and wherein the retrieving of the first extendable data does not affect an immutable data history of the first version of the immutable data.

18. The computer-implemented system of claim 11, wherein:

the first extendable data is added to a history of the first version of immutable data without having to create new versions of the immutable data.

19. The computer-implemented system of claim 11, wherein:

the first version of the immutable design data and the first extendable data are stored separately.

20. The computer-implemented system of claim 11, the operations further comprising:

managing permissions for the first extendable data; and independently managing permissions for second extendable data, wherein the second extendable data is augmented from the first version of the immutable design data without creating a new version of immutable data.

* * * * *